(12) United States Patent
Meng et al.

(10) Patent No.: US 12,510,966 B2
(45) Date of Patent: Dec. 30, 2025

(54) HAPTIC FEEDBACK METHOD, SYSTEM AND RELATED DEVICE FOR MATCHING SPLIT-TRACK MUSIC TO VIBRATION

(71) Applicant: AAC Acoustic Technologies (Shanghai) Co., Ltd., Shanghai (CN)

(72) Inventors: Zengyou Meng, Shanghai (CN); Mengya Cao, Shanghai (CN); Shiyu Pei, Shanghai (CN); Yajun Zheng, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 281 days.

(21) Appl. No.: 18/334,340

(22) Filed: Jun. 13, 2023

(65) Prior Publication Data

US 2024/0134459 A1 Apr. 25, 2024
US 2024/0231497 A9 Jul. 11, 2024

Related U.S. Application Data

(63) Continuation of application No. PCT/CN2022/136291, filed on Dec. 2, 2022.

(30) Foreign Application Priority Data

Oct. 20, 2022 (CN) .......................... 202211283874.3

(51) Int. Cl.
*G06F 3/01* (2006.01)
*G10H 1/00* (2006.01)

(52) U.S. Cl.
CPC ........... *G06F 3/016* (2013.01); *G10H 1/0008* (2013.01)

(58) Field of Classification Search
CPC . G06F 3/016; G06F 3/01; G06F 3/011; G10H 1/0008; Y02T 90/00; G06N 3/08; G10L 25/21
USPC ..................................................... 340/407.14
See application file for complete search history.

(56) References Cited

U.S. PATENT DOCUMENTS

| | | | |
|---|---|---|---|
| 2021/0055796 A1* | 2/2021 | Mansbridge | G06F 3/04812 |
| 2021/0090535 A1* | 3/2021 | Miles | G10H 1/0008 |
| 2021/0279030 A1* | 9/2021 | Morsy | G10L 25/30 |

* cited by examiner

*Primary Examiner* — Brian Wilson
(74) *Attorney, Agent, or Firm* — Wiersch Law Group (57) ABSTRACT

A haptic feedback method, system and related device for matching split-track music to vibration are provided. The method includes: acquiring raw audio data; obtaining multiple split-track audio data by splitting the raw audio data by using a predetermined deep learning model; calculating an energy proportion corresponding to a respective split-track audio data in the raw audio data; determining a weight of the respective split-track audio data according to the energy proportion; performing weighting calculation on the multiple split-track audio data according to a predetermined weighting rule, to obtain a time-frequency spectrum; generating a matched vibration signal corresponding to the raw audio data based on the time-frequency spectrum; and outputting a haptic feedback effect according to the matched vibration signal. The audio data can be matched to vibration, and a vibration feedback that more precisely matches cadences and rhythms of the audio data can be output.

8 Claims, 8 Drawing Sheets

HAPTIC FEEDBACK METHOD, SYSTEM AND RELATED DEVICE FOR MATCHING SPLIT-TRACK MUSIC TO VIBRATION

TECHNIC FIELD

The various embodiments described in this document relate in general to the application field of deep learning technology, and more specifically to a haptic feedback method, system and related device for matching split-track music to vibration.

BACKGROUND

Music can express the author's different emotions such as joy, sorrow, anger, strength and the like through different cadences, rhythms and tempos. Further, the haptic feedback technology of vibrations matched according to tempos and dynamics of music, gives a listener a more realistic and intense immersive sensory experience. Music contains different instrument components due to different styles, and different instrument components play different roles in the analysis of the cadences and rhythms of a piece of music. For example, because of the regularity of the percussion music, the cadences and rhythms of the percussion music can be more easily captured, and the percussion music can be matched to more accurate vibration feedback.

In the related technology, for example, in a method of generating vibration by using characteristics of music itself, a corresponding vibration may usually be generated based on music produced by a more rhythmic instrument such as drumbeats in music and the like. However, this method is not applicable to music with slow rhythms. At the same time, in the existing technology, there is no method of generating vibrations with different intensity levels of vibration by analyzing dynamics of different rhythms in music, thus bringing the user a more limited vibration feedback experience.

Therefore, it is desired to provide a new haptic feedback method to obtain a more precisely matched vibrational output with musical cadences, rhythms, etc.

SUMMARY

Embodiments of the present disclosure are intended to provide a method capable of producing a vibration output that more precisely matches cadences, rhythms, etc of music.

In some embodiments, a haptic feedback method for matching split-track to vibration is provided. The haptic feedback method is based on a deep learning model, and includes:
  acquiring raw audio data;
  splitting the raw audio data into tracks by using a predetermined deep learning model, to obtain a plurality of split-track audio data;
  calculating an energy proportion corresponding to a respective split-track audio data of the plurality of split-track audio data in the raw audio data;
  determining a weight of the respective split-track audio data according to the energy proportion corresponding to the respective split-track audio data;
  performing weighting calculation on the plurality of split-track audio data according to a predetermined weighting rule, to obtain a time-frequency spectrum and outputting the time-frequency spectrum;
  generating a matched vibration signal corresponding to the raw audio data based on the time-frequency spectrum; and
  outputting the matched vibration signal as a drive signal for a driver to achieve a haptic feedback effect.

In some embodiments, calculating the energy proportion corresponding to the respective split-track audio data of the plurality of split-track audio data in the raw audio data includes:
  performing a short-time Fourier transform process on the respective split-track audio data, to obtain a transformed split-track audio data corresponding to the respective split-track audio data; and
  calculating the energy proportion of the transformed split-track audio data in the raw audio data.

In some embodiments, generating the matched vibration signal corresponding to the raw audio data based on the time-frequency spectrum includes:
  performing a normalization process on the time-frequency spectrum, to obtain a time-frequency curve;
  setting vibration information corresponding to a portion with a frequency greater than a preset frequency threshold in the time-frequency spectrum;
  outputting the time-frequency curve containing the vibration information as the matched vibration signal.

In some embodiments, the plurality of split-track audio data at least include a first track, a second track, a third track and a fourth track with different track characteristics.

In some embodiments, the predetermined weighting rule includes:
  determining whether the energy proportion of the first track is largest;
  in response to the energy proportion of the first track being largest:
  determining whether the energy proportion of the second track is a second largest: taking a weighted result of the time-frequency spectrums of the first and second tracks as output in response to the energy proportion of the second track being the second largest, and only taking the time-frequency spectrum of the first track as output in response to the energy proportion of the second track being not the second largest;
  in response to the energy proportion of the first track being not largest:
  determine whether the energy proportion of the second track is largest;
  in response to the energy proportion of the second track being largest: determining whether the energy proportion of the first track is the second greatest: taking a weighted result of the time-frequency spectrums of the first and second tracks as output in response to the energy proportion of the first track being the second greatest, and only taking the time-frequency spectrum of the second track as output in response to the energy proportion of the first track being not the second greatest;
  in response to the energy proportion of the second track being not largest: determining whether the energy proportion of the third track is largest: taking the time-frequency spectrum of the fourth track as output in response to the energy proportion of the third track being not largest and taking the time-frequency spectrum of the third track as output in response to the energy proportion of the third track being largest.

In some embodiments, the first track is a percussion track, the second track is other instrument track, the third track is a vocal track, and the fourth track is a bass track.

In some embodiments, a haptic feedback system for matching split-track music to vibration is provided and includes:
- a raw audio acquisition module, configured to acquire raw audio data;
- a split-track module, configured to split the raw audio data into tracks by using a predetermined deep learning model to obtain a plurality of split-track audio data;
- a proportion calculation module, configured to calculate an energy proportion corresponding to a respective split-track audio data of the plurality of split-track audio data in the raw audio data;
- a weight determination module, configured to determining a weight of the respective split-track audio data according to the energy proportion corresponding to the respective split-track audio data;
- a weighting calculation module, configured to perform weighting calculation on the plurality of split-track audio data according to a predetermined weighting rule, to obtain a time-frequency spectrum and outputting the time-frequency spectrum;
- a vibration matching module, configured to generate a matched vibration signal corresponding to the raw audio data based on the time-frequency spectrum; and
- a haptic feedback module, configured to output the matched vibration signal as a drive signal for a driver to achieve a haptic feedback effect.

In some embodiments, a computer device is provided and includes: a memory, a processor and a computer program stored in the memory and executable by the processor. The processor, when executing the computer program, implements operations in the haptic feedback method for matching split-track music to vibration as described above.

In some embodiments, a computer readable storage medium is provided. The computer readable storage medium stores a computer program, and the computer program, when executed by a processor, implements operations in the haptic feedback method for matching split-track music to vibration as described above.

Compared with related technologies, in the haptic feedback method provided by the embodiments of the present disclosure, the music is split into tracks by using a predetermined deep learning model, to distinguish different tracks with different characteristics, then the importance of different tracks in the raw audio may be determined according to their energy proportions, to set different sizes of weights, and a flexible weighting combination may be performed on different tracks, to match vibration to audio data, and a vibration output that more precisely matches cadences and rhythms of the audio data may finally be output, so that the user gets a better haptic feedback experience.

BRIEF DESCRIPTION OF THE DRAWINGS

In order to illustrate the technical solutions in the embodiments of the present disclosure more clearly, the drawings used in the description of the embodiments will be briefly described below. It is apparent that the drawings in the following description are only some embodiments of the present disclosure. For those skilled in the art, other drawings may also be obtained in accordance with the drawings without any inventive effort.

DETAILED DESCRIPTION OF THE EMBODIMENTS

Technical solutions in embodiments of the present disclosure will be clearly and completely described with reference to accompany drawings of the present disclosure. Obviously, the described embodiments are only some embodiments rather than all embodiments of the present disclosure. Based on the embodiments of the present disclosure, all other embodiments obtained by persons skilled in the art without making any creative efforts fall into the protection scope of the present disclosure.

Figure 1:
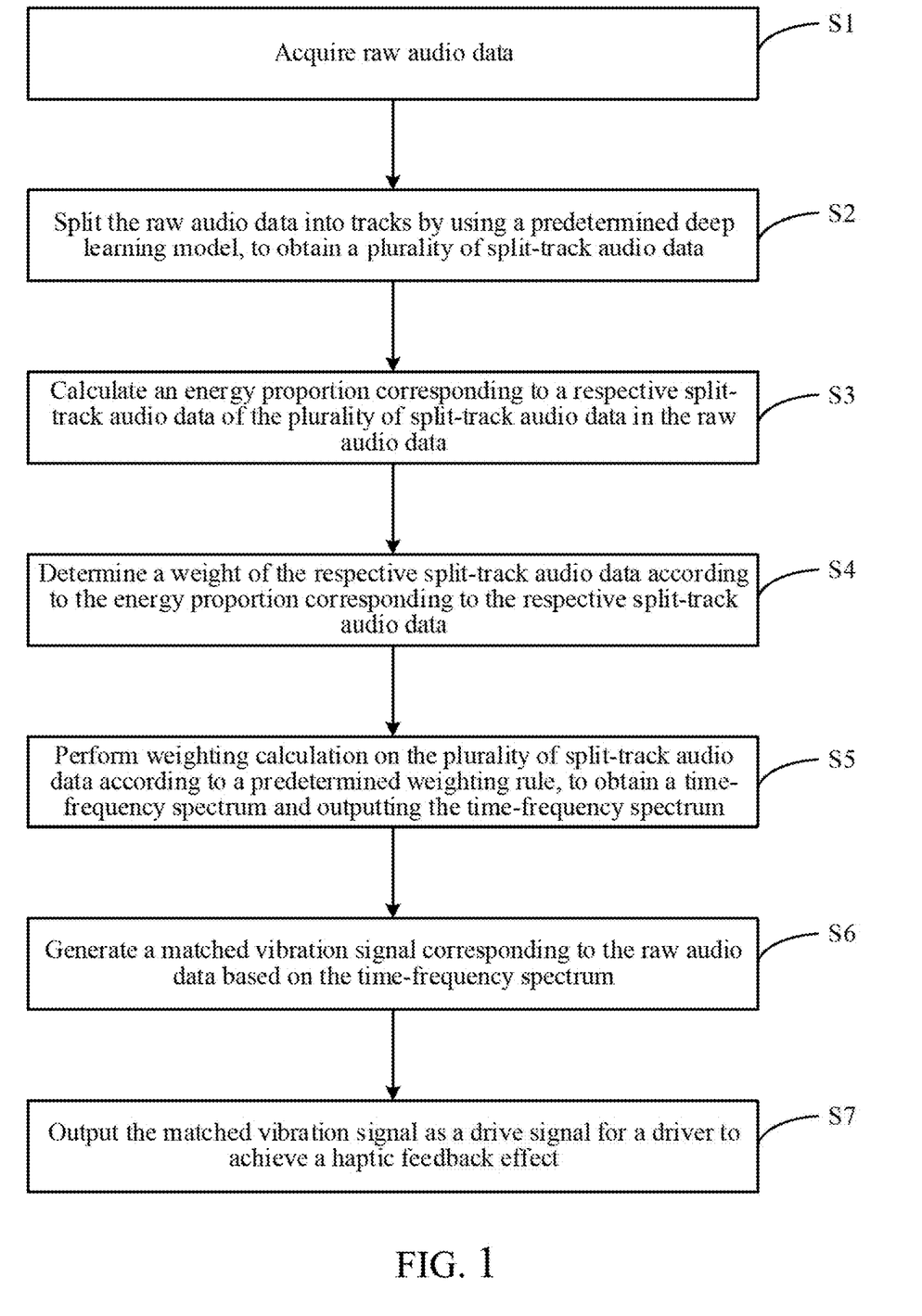
FIG. 1 is a flowchart of a haptic feedback method for matching split-track music to vibration in accordance with some embodiments of the present disclosure.

With reference to FIG. 1, FIG. 1 is a flowchart of a haptic feedback method for matching split-track music to vibration in accordance with some embodiments of the present disclosure. The haptic feedback method includes the following operations.

In S1, raw audio data are obtained.

Specifically, the raw audio data obtained in the embodiments of the present invention are not subjected to specific limitations on a form of music in which it is expressed, such as pop, rock, orchestral music, etc. The methods used to obtain the raw audio data include, but are not limited to, methods such as obtaining the raw audio data from existing audio data, or converting audio data extracted by means of a recorder, video capture, etc in real time into a separate audio data file.

In S2, a plurality of split-track audio data are obtained by splitting the raw audio data into tracks by using a predetermined deep learning model.

Figure 2:
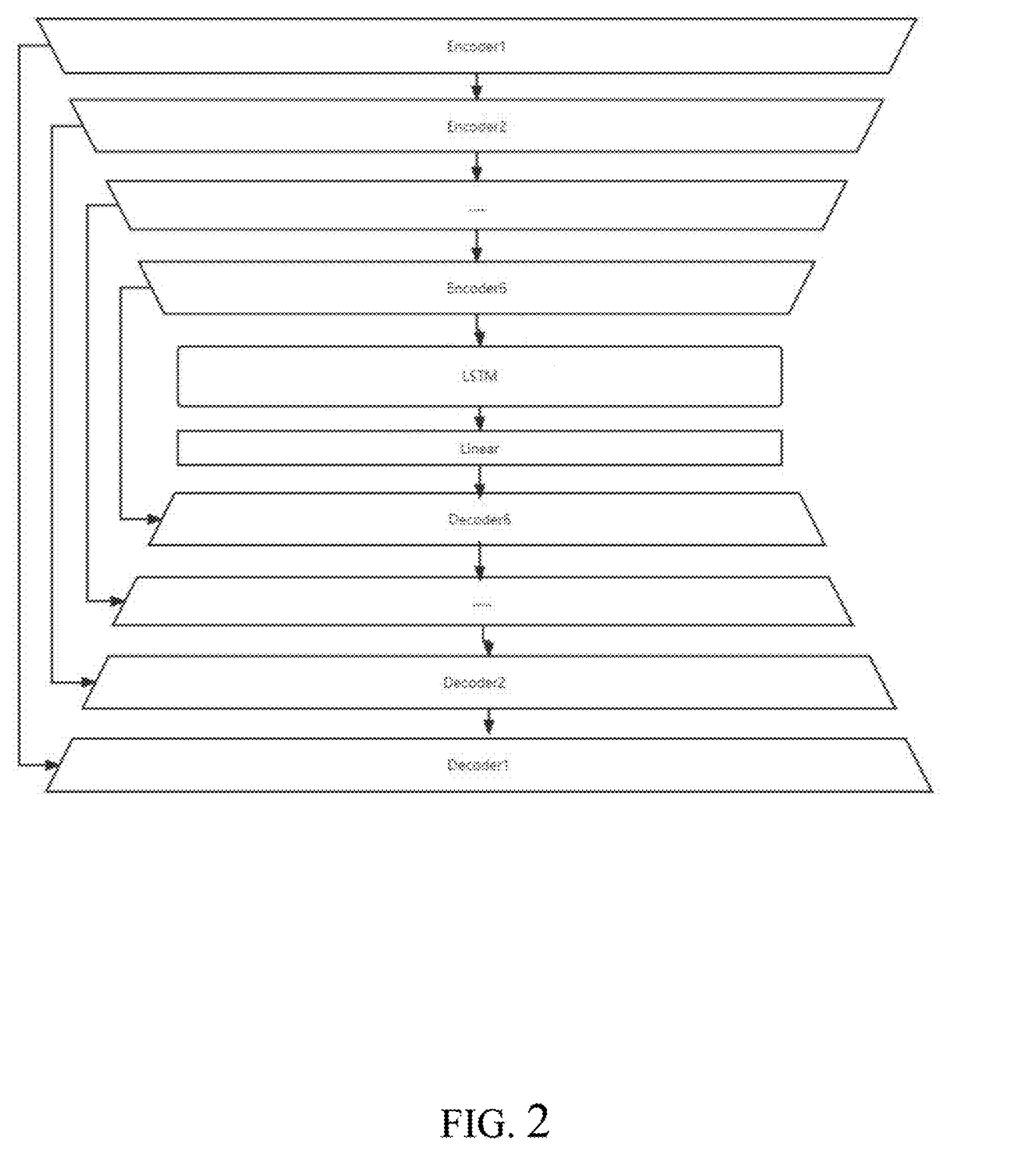
FIG. 2 is a schematic diagram illustrating a structure of a deep learning model in accordance with some embodiments of the present disclosure.

Herein, the deep learning model may be a neural network model for separating audio with various different characteristics in audio data. In some embodiments of the present disclosure, a structure of the deep learning model for splitting the raw audio data into tracks is shown in FIG. 2. The deep learning model includes an encoding layer including a plurality of encoders, a neural network recursive layer including a Long short-term memory (LSTM) structure, and a decoding layer including a plurality of decoders. In the neural network recursive layer, different LSTM modules may be set as needed to extract audio tracks with different characteristics.

Alternatively, the plurality of split-track audio data may at least include a first track, a second track, a third track and a fourth track with different track characteristics.

In S3, an energy proportion corresponding to a respective split-track audio data of the plurality of split-track audio data in the raw audio data is calculated.

Alternatively, the operation of calculating the energy proportion corresponding to the respective split-track audio data of the plurality of split-track audio data in the raw audio data includes:

performing a short-time Fourier transform process on the respective split-track audio data, to obtain a transformed split-track audio data corresponding to the respective split-track audio data; and calculating the energy proportion of the transformed split-track audio data in the raw audio data.

In S4, a weight of the respective split-track audio data is determined according to the energy proportion corresponding to the respective split-track audio data.

In S5, weighting calculation is performed on the plurality of split-track audio data according to a predetermined weighting rule, to obtain a time-frequency spectrum and outputting the time-frequency spectrum.

Alternatively, the predetermined weighting rule includes: taking one of the plurality of split-track audio data as a track to be used in generating the time-frequency spectrum.

Specifically, in a possible implementation, there are four split-track audio data, and the predetermined weighting rule includes:

determining whether the energy proportion of the first track is largest;

in response to the energy proportion of the first track being largest:

determining whether the energy proportion of the second track is the second largest: taking a weighted result of the time-frequency spectrums of the first and second tracks as output in response to the energy proportion of the second track being the second largest, and only taking the time-frequency spectrum of the first track as output in response to the energy proportion of the second track being not the second largest;

in response to the energy proportion of the first track being not largest:

determine whether the energy proportion of the second track is largest;

in response to the energy proportion of the second track being largest: determining whether the energy proportion of the first track is the second greatest: taking a weighted result of the time-frequency spectrums of the first and second tracks as output in response to the energy proportion of the first track being the second greatest, and only taking the time-frequency spectrum of the second track as output in response to the energy proportion of the first track being not the second greatest;

in response to the energy proportion of the second track being not largest: determining whether the energy proportion of the third track is largest: taking the time-frequency spectrum of the fourth track as output in response to the energy proportion of the third track being not largest and taking the time-frequency spectrum of the third track as output in response to the energy proportion of the third track being largest.

Figure 3:
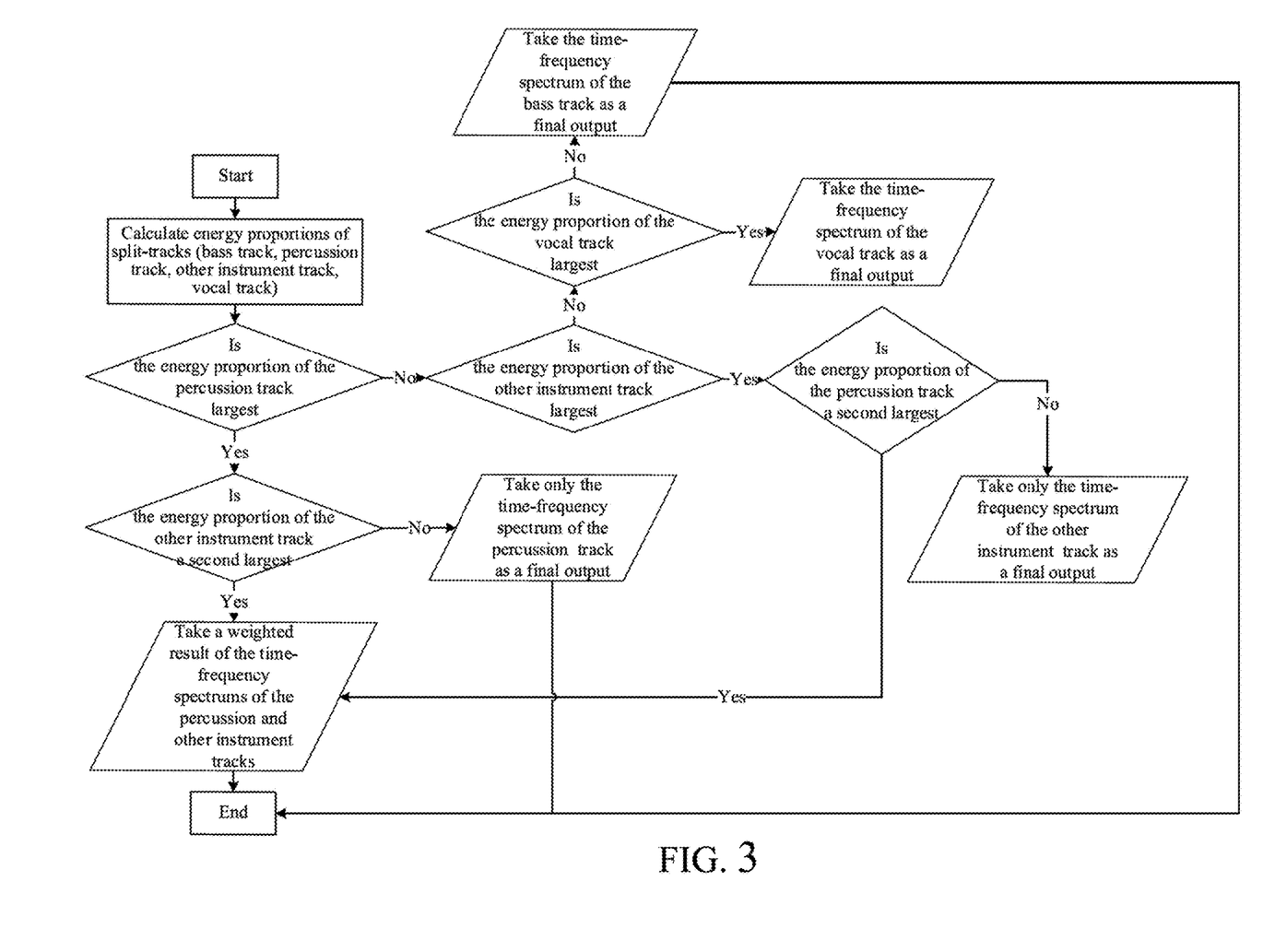
FIG. 3 is a schematic diagram illustrating a predetermined weighting rule in accordance with some embodiments of the present disclosure.

Alternatively, the first track is a percussion track, the second track is other instrument track, the third track is a vocal track, and the fourth track is a bass track. With reference to FIG. 3, FIG. 3 is a schematic diagram illustrating a predetermined weighting rule in accordance with some embodiments of the present disclosure. The bass track is a portion with lower frequencies in audio, and correspondingly, the audio may also include alto and treble. For a user, the listening feeling brought by the change of the bass is stronger than that of the alto or treble. The percussion track is a portion mainly expressing tempos in the audio, and the percussion is reflected in a regular fluctuant in frequencies, whereas the musical sounds produced by instruments other than the percussion instruments are usually combined with the percussion to reflect the type of music. The vocal track is special in the audio because the vocal does not have a regularity. However, when expression of the vocal in the music is fedback as vibration, it also has a great impact on the user experience.

According to the above predetermined weighting rule, the embodiments of the present disclosure is able to use at least one split-track audio data with the largest energy proportion in the audio data as the base data of the time-frequency spectrum, so that the time-frequency spectrum is more focused on reflecting the characteristics of the audio data that need to be matched correspondingly to generate vibration feedback.

In S6, a matched vibration signal corresponding to the raw audio data is generated based on the time-frequency spectrum.

Alternatively, the operation of generating the matched vibration signal corresponding to the raw audio data based on the time-frequency spectrum includes:

performing a normalization process on the time-frequency spectrum, to obtain a time-frequency curve;

setting vibration information corresponding to a portion with a frequency greater than a preset frequency threshold in the time-frequency spectrum;

outputting the time-frequency curve containing the vibration information as the matched vibration signal.

In S7, the matched vibration signal is output as a drive signal for a driver to achieve a haptic feedback effect.

In embodiments of the present disclosure, the haptic feedback effect may be achieved by using a vibration feedback system with a motor-based driver.

Figure 4:
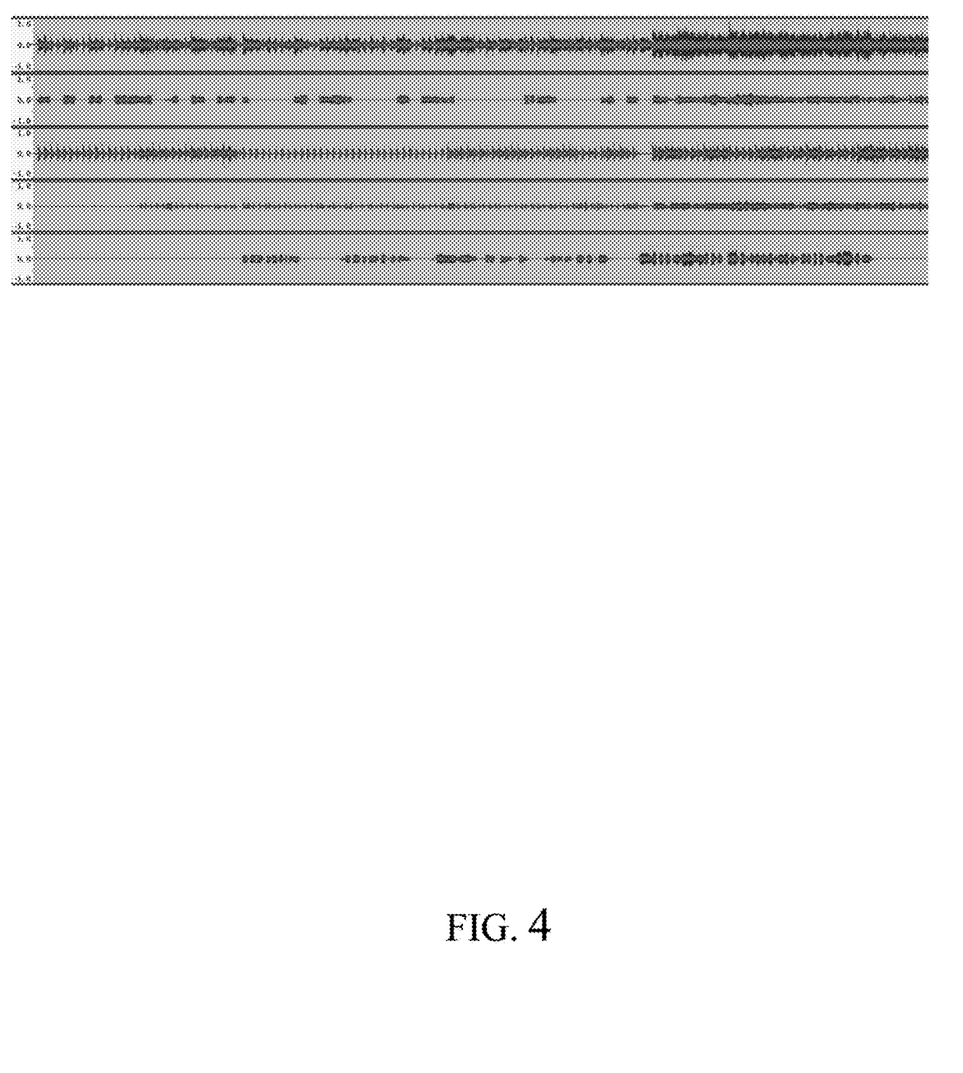
FIG. 4 is a schematic diagram illustrating tracks split by a deep learning model in accordance with some embodiments of the present disclosure.
Figure 5:
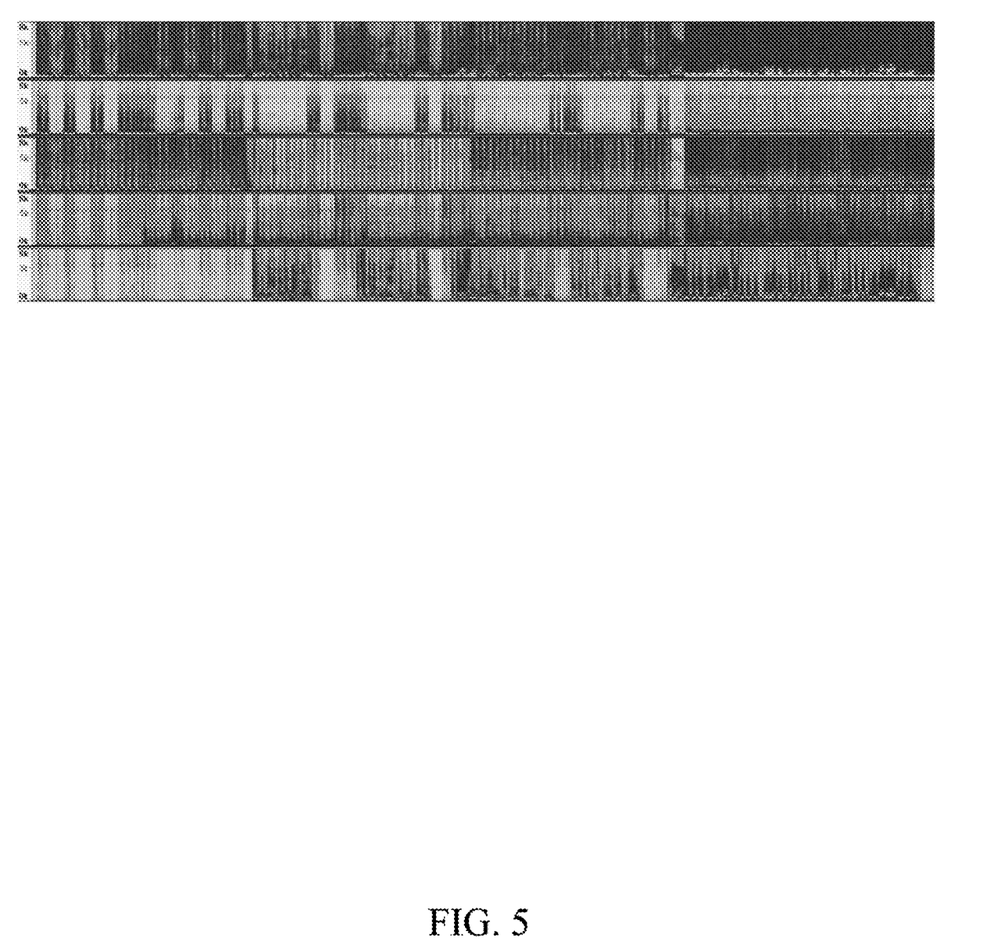
FIG. 5 is a comparison diagram of time-frequency spectrums of tracks in accordance with some embodiments of the present disclosure.
Figure 6:
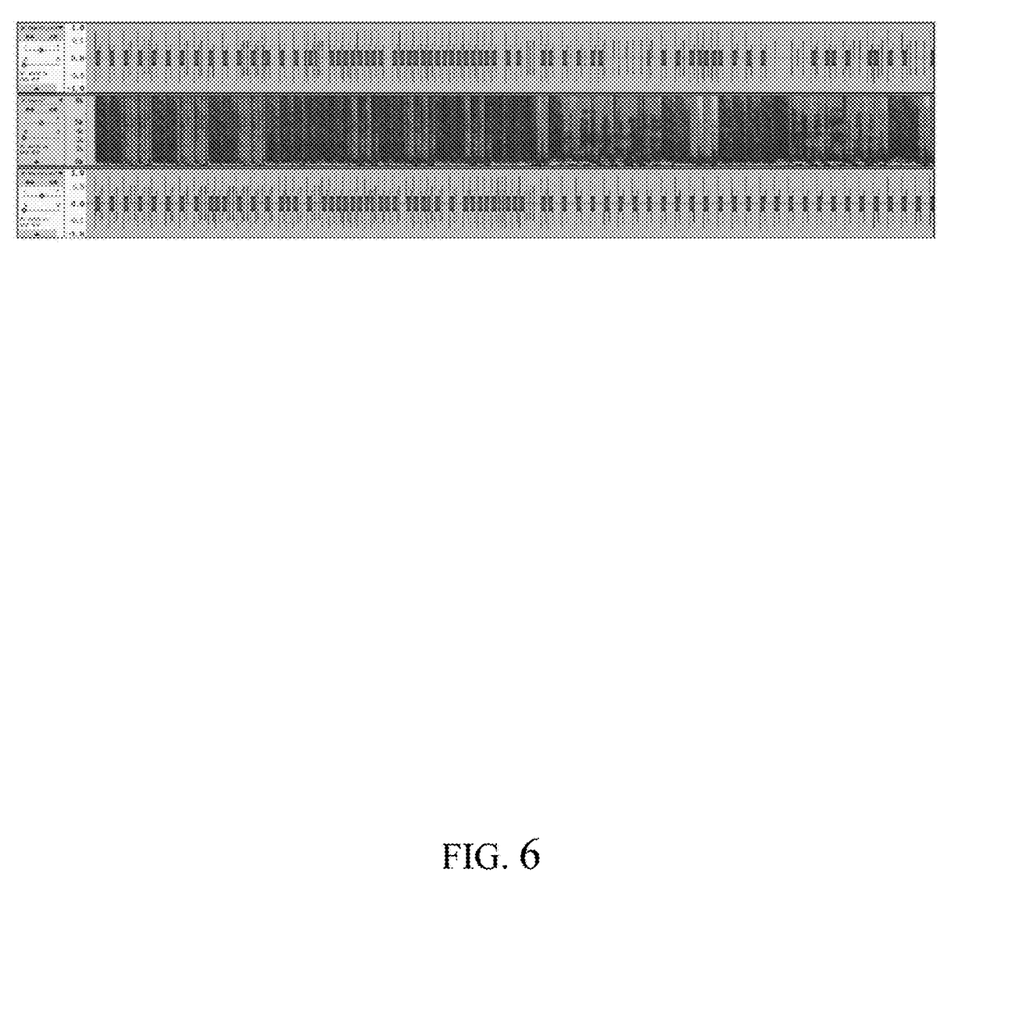
FIG. 6 is a schematic diagram of a matched vibration signal in accordance with some embodiments of the present disclosure.

Exemplarily, referring to FIG. 4, which is a schematic diagram illustrating tracks split by a deep learning model in accordance with some embodiments of the present disclosure, where tracks in FIG. 4 are, from top to bottom, the raw audio data, the bass track, the percussion track, the other instrument track, and the vocal track. As a comparison, referring to a comparison diagram of time-frequency spectrums of tracks shown in FIG. 5, it can be seen that, as a plurality of split-track audio data obtained from the raw audio data by splitting into tracks, there is a large difference in the energy proportions corresponding to the plurality of split-track audio data, due to different basic track characteristics. According to the different energy proportions, the matched vibration signal generated after performing weighting calculation according to the predetermined weighting rule in the embodiments of the present disclosure is shown in FIG. 6, where the first row is unprocessed general vibration signal, and the third row is the matched vibration signal after performing weighting calculation according to the embodiments of the present disclosure.

Compared with related technologies, in the haptic feedback method provided by the embodiments of the present disclosure, the music is split into tracks by using a predetermined deep learning model, to distinguish different tracks with different characteristics, then the importance of different tracks in the raw audio may be determined according to their energy proportions, to set different sizes of weights, and a flexible weighting combination may be performed on different tracks, to match vibration to audio data, and a vibration output that more precisely matches cadences and rhythms of the audio data may finally be output, so that the user gets a better haptic feedback experience.

Figure 7:
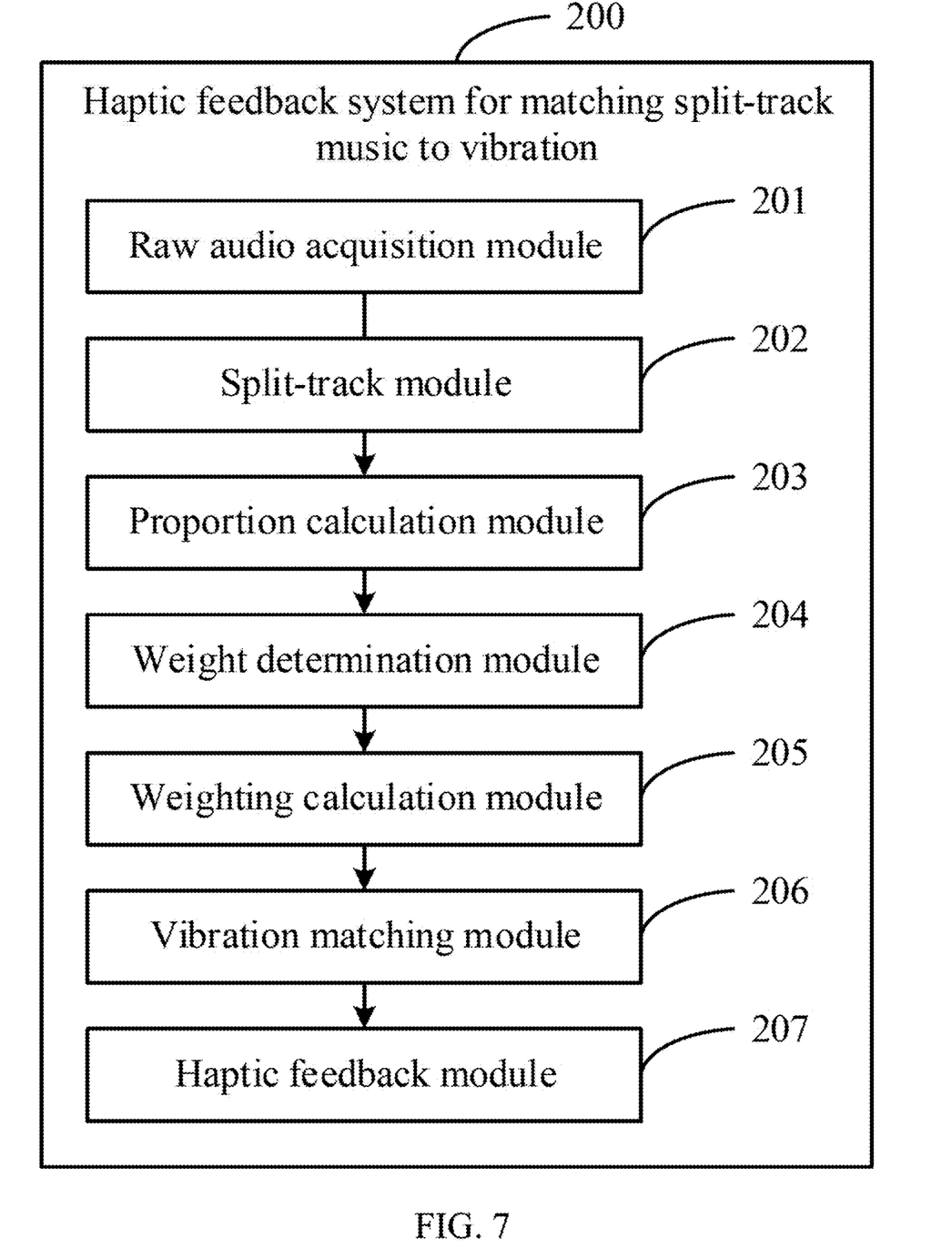
FIG. 7 is a schematic diagram illustrating a structure of a system 200 for generating a haptic feedback effect in accordance with some embodiments of the present disclosure.

Some embodiments of the present disclosure further provide a haptic feedback system for matching split-track music to vibration. With reference to FIG. 7, FIG. 7 is a schematic diagram illustrating a structure of a system 200 for generating a haptic feedback effect in accordance with some embodiments of the present disclosure. The system includes:
- a raw audio acquisition module 201, configured to acquire raw audio data;
- a split-track module 202, configured to split the raw audio data into tracks by using a predetermined deep learning model to obtain a plurality of split-track audio data;
- a proportion calculation module 203, configured to calculate an energy proportion corresponding to a respective split-track audio data of the plurality of split-track audio data in the raw audio data;
- a weight determination module 204, configured to determining a weight of the respective split-track audio data according to the energy proportion corresponding to the respective split-track audio data;
- a weighting calculation module 205, configured to perform weighting calculation on the plurality of split-track audio data according to a predetermined weighting rule, to obtain a time-frequency spectrum and outputting the time-frequency spectrum;
- a vibration matching module 206, configured to generate a matched vibration signal corresponding to the raw audio data based on the time-frequency spectrum; and
- a haptic feedback module 207, configured to output the matched vibration signal as a drive signal for a driver to achieve a haptic feedback effect.

The haptic feedback system 200 provided by the embodiments of the present disclosure may implement the operations in the haptic feedback method for matching split-track music to vibration as described in the above embodiments, and can achieve the same technical effect, referring to the description in the above embodiments, and will not be repeated here.

Figure 8:
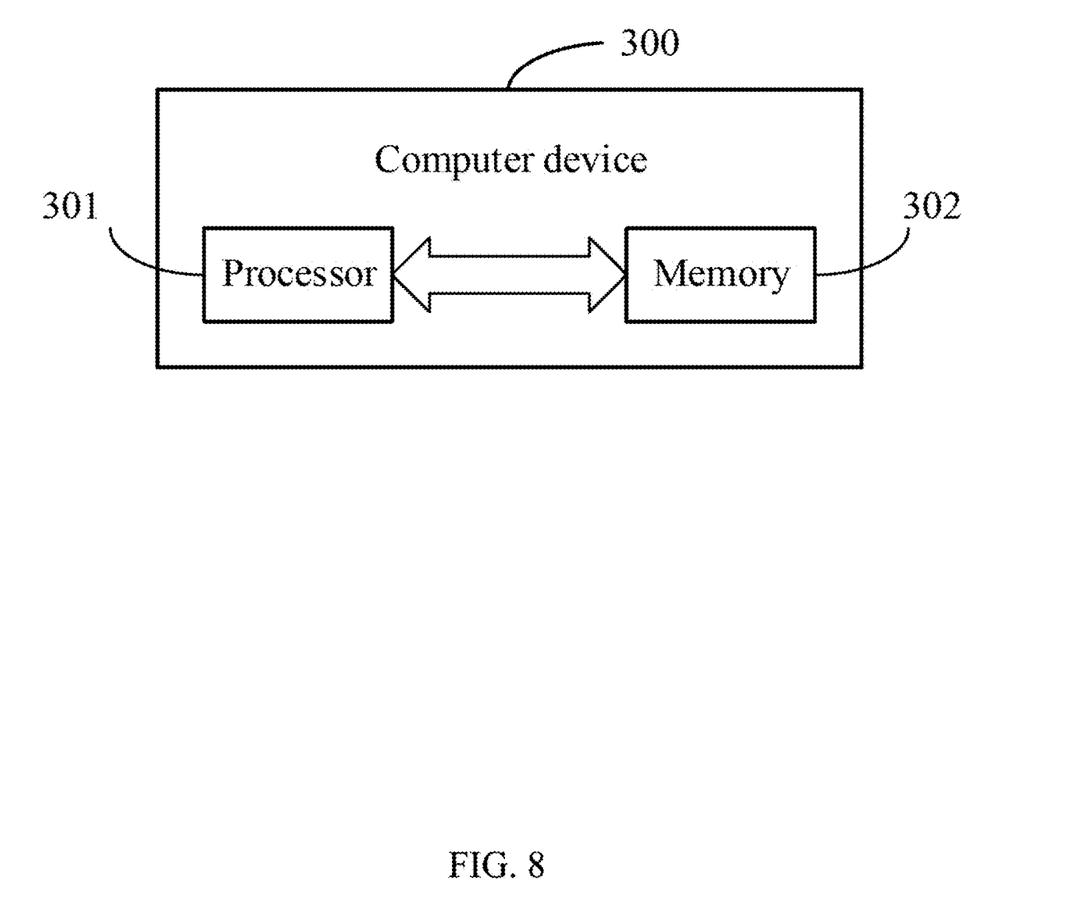
FIG. 8 is a schematic diagram illustrating a structure of a computer device in accordance with some embodiments of the present disclosure.

Some embodiments of the present disclosure further provide a computer device. With reference to FIG. 8, FIG. 8 is a schematic diagram illustrating a structure of a computer device in accordance with some embodiments of the present disclosure. The computer device 300 includes: a processor 301, a memory 302 and a computer program stored in the memory 302 and executable by the processor 301.

Referring to FIG. 1, the processor 301 calls the computer program stored in the memory 302, and implements, when executing the computer program, the operations in the haptic feedback method for matching split-track music to vibration in the above embodiments, including:
- acquiring raw audio data;
- splitting the raw audio data into tracks by using a predetermined deep learning model, to obtain a plurality of split-track audio data;
- calculating an energy proportion corresponding to a respective split-track audio data of the plurality of split-track audio data in the raw audio data;
- determining a weight of the respective split-track audio data according to the energy proportion corresponding to the respective split-track audio data;
- performing weighting calculation on the plurality of split-track audio data according to a predetermined weighting rule, to obtain a time-frequency spectrum and outputting the time-frequency spectrum;
- generating a matched vibration signal corresponding to the raw audio data based on the time-frequency spectrum; and
- outputting the matched vibration signal as a drive signal for a driver to achieve a haptic feedback effect.

In some embodiments, the operation of calculating the energy proportion corresponding to the respective split-track audio data of the plurality of split-track audio data in the raw audio data includes:
- performing a short-time Fourier transform process on the respective split-track audio data, to obtain a transformed split-track audio data corresponding to the respective split-track audio data; and
- calculating the energy proportion of the transformed split-track audio data in the raw audio data.

In some embodiments, the operation of generating the matched vibration signal corresponding to the raw audio data based on the time-frequency spectrum includes:
- performing a normalization process on the time-frequency spectrum, to obtain a time-frequency curve;
- setting vibration information corresponding to a portion with a frequency greater than a preset frequency threshold in the time-frequency spectrum;
- outputting the time-frequency curve containing the vibration information as the matched vibration signal.

In some embodiments, the plurality of split-track audio data at least include a first track, a second track, a third track and a fourth track with different track characteristics.

In some embodiments, the predetermined weighting rule includes:
- determining whether the energy proportion of the first track is largest;
- in response to the energy proportion of the first track being largest:
- determining whether the energy proportion of the second track is the second largest: taking a weighted result of the time-frequency spectrums of the first and second tracks as output in response the energy proportion of the second track being the second largest, and taking only the time-frequency spectrum of the first track as output in response the energy proportion of the second track being not the second largest;
- in response to the energy proportion of the first track being not largest:
- determine whether the energy proportion of the second track is largest;
- in response to the energy proportion of the second track being largest: determining whether the energy proportion of the first track is the second greatest: taking a weighted result of the time-frequency spectrums of the first and second tracks as output in response to the energy proportion of the first track being the second greatest, and taking only the time-frequency spectrum of the second track as output in response to the energy proportion of the first track being not the second greatest;
- in response to the energy proportion of the second track being not largest: determining whether the energy proportion of the third track is largest: taking the time-frequency spectrum of the fourth track as output in response to the energy proportion of the third track being not largest and taking the time-frequency spectrum of the third track as output in response to the energy proportion of the third track being largest.

In some embodiments, the first track is a percussion track, the second track is other instrument track, the third track is a vocal track, and the fourth track is a bass track.

The computer device 300 provided by the embodiments of the present disclosure may implement the operations in the haptic feedback method for matching split-track music to vibration as described in the above embodiments, and can achieve the same technical effect, referring to the description in the above embodiments, and will not be repeated here.

Some embodiments of the present disclosure further provide a computer readable storage medium. The computer readable storage medium stores a computer program, and the computer program, when executed by a processor, implements the procedures and operations in the haptic feedback method for matching split-track music to vibration as described in the above embodiments, and can achieve the same technical effect, and will not be repeated here to avoid repetition.

The above are only embodiments of the present disclosure. It shall be indicated that those of ordinary skill in the art can make improvements without departing from the creative concept of the present disclosure, and these belong to the protection scope of the present disclosure.

What is claimed is:

1. A haptic feedback method for matching split-track music to vibration, based on a predetermined deep learning model, comprising:
   acquiring raw audio data;
   splitting the raw audio data into tracks by using the predetermined deep learning model, to obtain a plurality of split-track audio data;
   calculating an energy proportion corresponding to a respective split-track audio data of the plurality of split-track audio data in the raw audio data;
   determining a weight of the respective split-track audio data according to the energy proportion corresponding to the respective split-track audio data;
   performing weighting calculation on the plurality of split-track audio data according to a predetermined weighting rule, to obtain a time-frequency spectrum and outputting the time-frequency spectrum;
   generating a matched vibration signal corresponding to the raw audio data based on the time-frequency spectrum; and
   outputting the matched vibration signal as a drive signal for a driver to achieve a haptic feedback effect.

2. The haptic feedback method for matching split-track music to vibration of claim 1, wherein calculating the energy proportion corresponding to the respective split-track audio data of the plurality of split-track audio data in the raw audio data comprises:
   performing a short-time Fourier transform process on the respective split-track audio data, to obtain a transformed split-track audio data corresponding to the respective split-track audio data; and
   calculating the energy proportion of the transformed split-track audio data in the raw audio data.

3. The haptic feedback method for matching split-track music to vibration of claim 1, wherein generating the matched vibration signal corresponding to the raw audio data based on the time-frequency spectrum comprises:
   performing a normalization process on the time-frequency spectrum, to obtain a time-frequency curve;
   setting vibration information corresponding to a portion with a frequency greater than a preset frequency threshold in the time-frequency spectrum;
   outputting the time-frequency curve containing the vibration information as the matched vibration signal.

4. The haptic feedback method for matching split-track music to vibration of claim 1, wherein the plurality of split-track audio data at least comprise a first track, a second track, a third track and a fourth track with different track characteristics.

5. The haptic feedback method for matching split-track music to vibration of claim 4, wherein the predetermined weighting rule comprises:
   determining whether the energy proportion of the first track is largest;
   in response to the energy proportion of the first track being largest:
   determining whether the energy proportion of the second track is a second largest;
   taking a weighted result of the time-frequency spectrums of the first and second tracks as output in response to the energy proportion of the second track being the second largest; and
   taking the time-frequency spectrum of the first track as output in response to the energy proportion of the second track being not the second largest;
   in response to the energy proportion of the first track being not largest:
   determine whether the energy proportion of the second track is largest;
   in response to the energy proportion of the second track being largest:
   determining whether the energy proportion of the first track is the second greatest;
   taking a weighted result of the time-frequency spectrums of the first and second tracks as output in response to the energy proportion of the first track being the second greatest; and
   taking the time-frequency spectrum of the second track as output in response to the energy proportion of the first track being not the second greatest;
   in response to the energy proportion of the second track being not largest:
   determining whether the energy proportion of the third track is largest;
   taking the time-frequency spectrum of the fourth track as output in response to the energy proportion of the third track being not largest; and
   taking the time-frequency spectrum of the third track as output in response to the energy proportion of the third track being largest.

6. The haptic feedback method for matching split-track music to vibration of claim 4, wherein the first track is a percussion track, the second track is other instrument track, the third track is a vocal track, and the fourth track is a bass track.

7. A computer device comprising: a memory, a processor and a computer program stored in the memory and executable by the processor; the processor, when executing the computer program, implementing operations in the haptic feedback method for matching split-track music to vibration according to claim 1.

8. A non-transitory computer readable storage medium storing a computer program, and the computer program, when executed by a processor, implementing operations in the haptic feedback method for matching split-track music to vibration according to claim 1.

* * * * *